(12) United States Patent
Lee et al.

(10) Patent No.: US 11,837,143 B2
(45) Date of Patent: *Dec. 5, 2023

(54) DISPLAY APPARATUS AND A METHOD OF DRIVING THE SAME

(71) Applicant: SAMSUNG DISPLAY CO., LTD., Yongin-si (KR)

(72) Inventors: Hyo Jin Lee, Yongin-si (KR); Jae Keun Lim, Suwon-si (KR); Hong Soo Kim, Hwaseong-si (KR); Jinyoung Roh, Hwaseong-si (KR); Sehyuk Park, Seongnam-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/092,510

(22) Filed: Jan. 3, 2023

(65) Prior Publication Data

US 2023/0137070 A1     May 4, 2023

Related U.S. Application Data

(63) Continuation of application No. 17/520,907, filed on Nov. 8, 2021, now Pat. No. 11,545,067, which is a (Continued)

(30) Foreign Application Priority Data

Aug. 16, 2019    (KR) .......................... 10-2019-0100621

(51) Int. Cl.
    *G09G 3/20*        (2006.01)

(52) U.S. Cl.
CPC ..... *G09G 3/2074* (2013.01); *G09G 2310/027* (2013.01); *G09G 2320/0247* (2013.01); *G09G 2330/028* (2013.01)

(58) Field of Classification Search
CPC .......... G09G 3/2074; G09G 2310/027; G09G 2330/028; G09G 2320/0247
See application file for complete search history.

(56) References Cited

U.S. PATENT DOCUMENTS 11,170,694 B2 * 11/2021 Lee ........................... G09G 5/18
11,545,067 B2 * 1/2023 Lee ........................... G09G 5/18
(Continued)

FOREIGN PATENT DOCUMENTS

EP          2905770       8/2015
KR    10-2016-0025198    3/2016
(Continued)

OTHER PUBLICATIONS

European Search Report dated Oct. 19, 2020 issued in corresponding European Patent Application No. 20191132.8.

*Primary Examiner* — Andrew Sasinowski
(74) *Attorney, Agent, or Firm* — F. Chau & Associates, LLC

(57) ABSTRACT

A display apparatus including: a display panel configured to display an image based on input image data; a data driver configured to output a data voltage to the display panel; and a driving controller configured to determine a driving frequency of the display panel based on flicker values for grayscale values of the input image data and output a driving frequency signal representing the driving frequency of the display panel to a host.

14 Claims, 10 Drawing Sheets

Related U.S. Application Data continuation of application No. 16/943,170, filed on Jul. 30, 2020, now Pat. No. 11,170,694.

(56) References Cited

U.S. PATENT DOCUMENTS

| | | |
|---|---|---|
| 2015/0340014 A1 | 11/2015 | Kim et al. |
| 2017/0249885 A1 | 8/2017 | Tamura |
| 2018/0033384 A1 | 2/2018 | Kim et al. |
| 2018/0308418 A1 | 10/2018 | Scenini |
| 2021/0049949 A1 | 2/2021 | Lee et al. |
| 2022/0059012 A1 | 2/2022 | Lee et al. |

FOREIGN PATENT DOCUMENTS

| | | |
|---|---|---|
| KR | 10-2016-0031088 | 3/2016 |
| KR | 10-2016-0115476 | 10/2016 |
| KR | 10-2016-0149365 | 12/2016 |
| KR | 10-1727792 | 4/2017 |
| KR | 10-2018-0032740 | 4/2018 |

\* cited by examiner

FIG. 4

| STAGE | INPUT GRAYSCALE (8bit) | FLICKER VALUE | FREQUENCY(Hz) |
|---|---|---|---|
| 1 | 0-3 | 0 | 1 |
| 2 | 4-7 | 0 | 1 |
| 3 | 8-11 | 40 | 2 |
| 4 | 12-15 | 80 | 5 |
| 5 | 16-19 | 120 | 10 |
| 6 | 20-23 | 160 | 30 |
| 7 | 24-27 | 200 | 60 |
| ⋮ | ⋮ | ⋮ | ⋮ |
| 60 | 236-239 | 0 | 1 |
| 61 | 240-243 | 0 | 1 |
| 62 | 244-247 | 0 | 1 |
| 63 | 248-251 | 0 | 1 |
| 64 | 252-255 | 0 | 1 |

| DLY | PARAMETER |
|---|---|
| 0us | 0x00 |
| 10us | 0x10 |
| 20us | 0x20 |
| ⋮ | ⋮ |
| 100us | 0xFF |

FIG. 12

| SEG11 | SEG12 | SEG13 | SEG14 | SEG15 |
|-------|-------|-------|-------|-------|
| SEG21 | SEG22 | SEG23 | SEG24 | SEG25 |
| SEG31 | SEG32 | SEG33 | SEG34 | SEG35 |
| SEG41 | SEG42 | SEG43 | SEG44 | SEG45 |
| SEG51 | SEG52 | SEG53 | SEG54 | SEG55 |
| SEG61 | SEG62 | SEG63 | SEG64 | SEG65 |
| SEG71 | SEG72 | SEG73 | SEG74 | SEG75 |
| SEG81 | SEG82 | SEG83 | SEG84 | SEG85 |

~100

DISPLAY APPARATUS AND A METHOD OF DRIVING THE SAME

CROSS-REFERENCE TO RELATED APPLICATIONS

This application is a continuation of U.S. patent application Ser. No. 17/520,907 filed on Nov. 8, 2021, which is a continuation of U.S. patent application Ser. No. 16/943,170 filed on Jul. 30, 2020, now U.S. Pat. No. 11,170,694 issued on Nov. 9, 2021, which claims priority under 35 U.S.C. § 119 to Korean Patent Application No. 10-2019-0100621, filed on Aug. 16, 2019 in the Korean Intellectual Property Office (KIPO), the disclosures of which are incorporated by reference herein in their entireties.

TECHNICAL FIELD

Exemplary embodiments of the present inventive concept relate to a display apparatus and a method of driving the display apparatus.

DESCRIPTION OF THE RELATED ART

A method to minimize a power consumption of an information technology (IT) product such as a tablet personal computer (PC) and a note PC have been studied.

When an IT product includes a display panel, reducing power consumption of the display panel may minimize the overall power consumption of the IT product. To reduce power consumption of the display panel, the display panel may be driven with a relatively low frequency when the display panel displays a still image.

A display apparatus may include a display panel and a display panel driver for driving the display panel. The display panel driver receives input image data from a host. The display panel driver generates a data voltage based on the input image data and outputs the data voltage to the display panel so that the display panel can display an image.

The display panel driver does not, however, provide the host with a driving frequency of the display panel. Therefore, the display apparatus may consume unnecessary power.

SUMMARY

According to an exemplary embodiment of the present inventive concept, there is provided a display apparatus including: a display panel configured to display an image based on input image data; a data driver configured to output a data voltage to the display panel; and a driving controller configured to determine a driving frequency of the display panel based on flicker values for grayscale values of the input image data and output a driving frequency signal representing the driving frequency of the display panel to a host.

The driving controller may include: a data processor configured to receive the input image data from the host and generate intermediate image data based on the input image data; and a frequency determiner configured to determine the driving frequency of the display panel and output the driving frequency signal representing the driving frequency of the display panel to the host.

The frequency determiner may include: a flicker value storage configured to store flicker values for grayscale values of the intermediate image data; and a driving frequency determiner configured to determine the driving frequency of the display panel based on whether the intermediate image data represents a still image or a video image and information provided from the flicker value storage.

The frequency determiner may further include a still image determiner configured to determine whether the intermediate image data represents the still image or the video image, generate a flag representing whether the intermediate image data represents the still image or the video image and output the flag to the driving frequency determiner.

The display panel may include a plurality of segments, and wherein the driving frequency determiner is configured to determine the driving frequency of the display panel based on driving frequencies for the segments.

The data processor may be configured to generate the intermediate image data by converting a frequency of the input image data, and a frequency of the intermediate image data may be equal to or greater than the frequency of the input image data.

The driving frequency signal may be a converted vertical synchronization signal generated by converting an input vertical synchronization signal corresponding to the frequency of the intermediate image data to correspond to the driving frequency of the display panel.

The driving frequency signal may be an image update request signal.

The driving frequency signal may be output to the host before the intermediate image data is processed by the driving controller, and timing information for outputting the driving frequency signal to the host by the driving controller may be stored in the driving controller as a parameter.

The data processor may be configured to output a synchronization signal corresponding to the intermediate image data to the host, and the frequency determiner may be configured to output the driving frequency signal to the host.

The synchronization signal may be an input vertical synchronization signal corresponding to a frequency of the intermediate image data, and the driving frequency signal may be a converted vertical synchronization signal generated by converting the input vertical synchronization signal to correspond to the driving frequency of the display panel.

The driving controller may further include a selector, wherein the data processor is configured to output a synchronization signal corresponding to the intermediate image data to the selector, wherein the frequency determiner is configured to output the driving frequency signal to the selector, wherein when the intermediate image data represents the video image, the selector is configured to output the synchronization signal to the host, and wherein when the intermediate image data represents the still image, the selector is configured to output the driving frequency signal to the host.

The driving controller may be configured to communicate with the host using an embedded display port interface, wherein the host includes a source device function circuit, wherein the driving controller include a sink device function circuit, and wherein the embedded display port interface includes a main link channel configured to transmit data in a direction only from the source device function circuit to the sink device function circuit, an auxiliary (AUX) channel configured to transmit data in both directions between the source device function circuit and the sink device function circuit and a hot plug detect channel configured to transmit data in a direction only from the sink device function circuit to the source device function circuit.

The driving frequency signal may be included in a display port configuration data register and output to the host through the AUX channel.

The driving frequency signal may be output to the host through the hot plug detect channel.

According to an exemplary embodiment of the present inventive concept, there is provided a method of driving a display apparatus, the method including: receiving input image data from a host; determining a driving frequency of a display panel based on flicker values for grayscale values of the input image data; outputting a driving frequency signal representing the driving frequency of the display panel to the host; generating a data voltage based on the input image data and the driving frequency; and outputting the data voltage to the display panel.

The method may further include generating intermediate image data based on the input image data, wherein the driving frequency of the display panel is determined based on whether the intermediate image data represents a still image or a video image and by using a flicker value storage that stores the flicker values for the grayscale values.

The determining the driving frequency of the display panel may include: determining whether the intermediate image data represents the still image or the video image; and generating a flag representing whether the intermediate image data represents the still image or the video image.

The driving frequency signal may be a converted vertical synchronization signal generated by converting an input vertical synchronization signal corresponding to a frequency of the intermediate image data to correspond to the driving frequency of the display panel.

The method may further include outputting a synchronization signal corresponding to the intermediate image data to the host.

The method may further include: outputting a synchronization signal corresponding to the intermediate image data to a selector; and outputting the driving frequency signal to the selector, wherein when the intermediate image data represents the video image, the selector is configured to output the synchronization signal to the host, and wherein when the intermediate image data represents the still image, the selector is configured to output the driving frequency signal to the host.

According to an exemplary embodiment of the present inventive concept, there is provided a display apparatus including: a display panel configured to display an image based on input image data provided from a host; and a driving controller configured to adjust a driving frequency of the display panel based on a flicker value according to a grayscale value of the input image data and output a signal indicative of the driving frequency to the host.

BRIEF DESCRIPTION OF THE DRAWINGS

The above and other features of the present inventive concept will become more apparent by describing in detail exemplary embodiments thereof with reference to the accompanying drawings, in which:

FIG. 4 is a table illustrating a flicker value storage of FIG. 3;

FIG. 12 is a diagram illustrating a display panel of a display apparatus according to an exemplary embodiment of the present inventive concept.

DETAILED DESCRIPTION OF THE EMBODIMENTS

Hereinafter, exemplary embodiments of the present inventive concept will be explained in detail with reference to the accompanying drawings.

Figure 1:
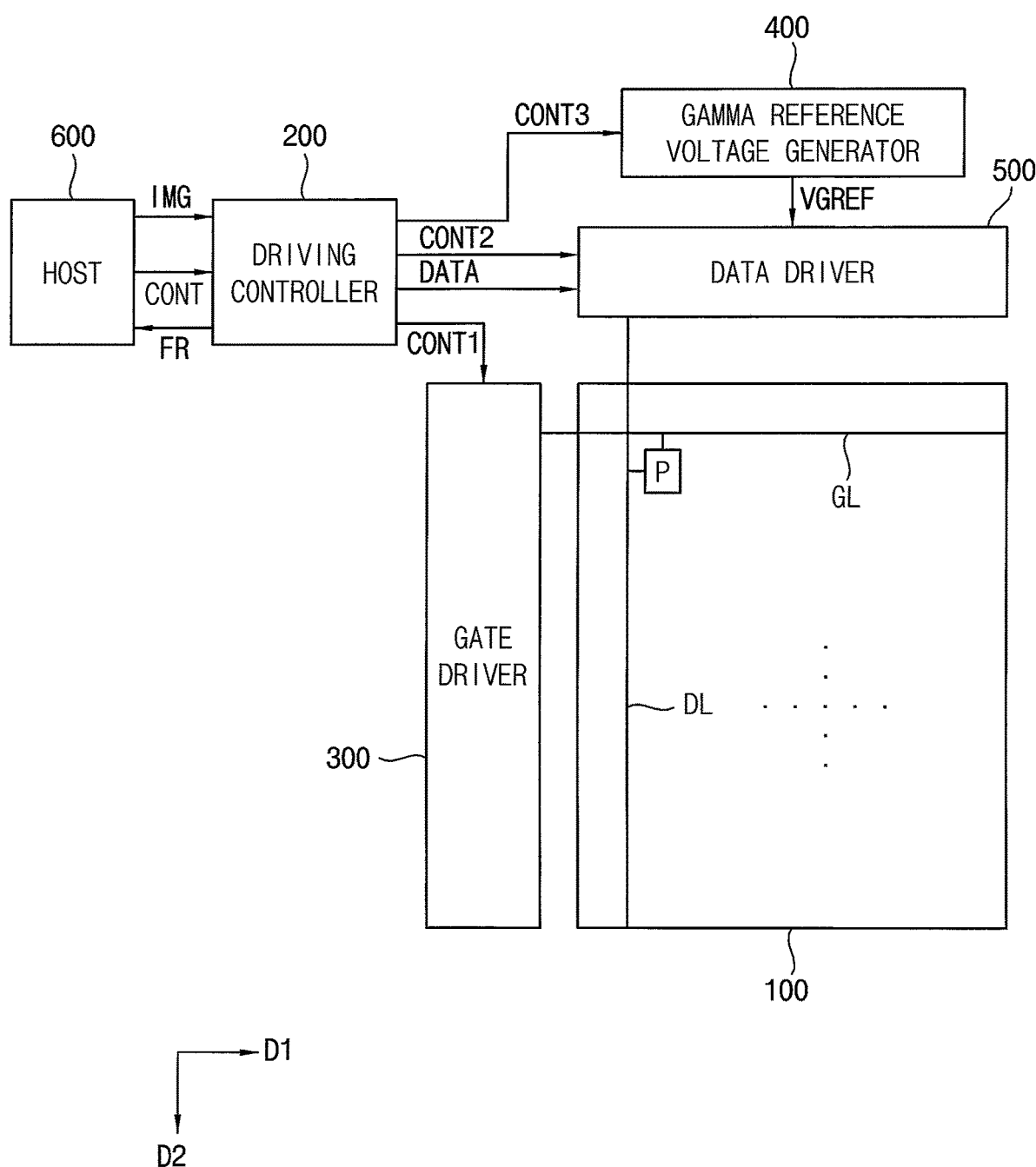
FIG. 1 is a block diagram illustrating a display apparatus according to an exemplary embodiment of the present inventive concept.

FIG. 1 is a block diagram illustrating a display apparatus according to an exemplary embodiment of the present inventive concept.

Referring to FIG. 1, the display apparatus includes a display panel 100 and a display panel driver. The display panel driver includes a driving controller 200, a gate driver 300, a gamma reference voltage generator 400 and a data driver 500. The display apparatus may further include a host 600.

For example, the driving controller 200 and the data driver 500 may be integrally formed. For example, the driving controller 200, the gamma reference voltage generator 400 and the data driver 500 may be integrally formed. A driving module including at least the driving controller 200 and the data driver 500 which are integrally formed may be referred to as a timing controller embedded data driver (TED).

The display panel 100 includes a plurality of gate lines GL, a plurality of data lines DL and a plurality of pixels P connected to the gate lines GL and the data lines DL. The gate lines GL extend in a first direction D1 and the data lines DL extend in a second direction D2 crossing the first direction D1.

The display panel 100 may be driven in a normal driving mode in which the display panel 100 is driven with a normal driving frequency and in a low frequency driving mode in which the display panel 100 is driven with a frequency less than the normal driving frequency. In other words, the display panel 100 may be driven in a first driving mode (e.g., the normal driving mode) and a second driving mode (e.g., the low frequency driving mode).

For example, when the input image data IMG represents a video image (e.g., a moving image), the display panel 100 may be driven in the normal driving mode. For example, when the input image data IMG represents a still image, the display panel 100 may be driven in the low frequency driving mode. For example, when the display apparatus is operated in the always on mode, the display panel 100 may be driven in the low frequency driving mode.

The display panel 100 may be driven in a unit of frame. The display panel 100 may be refreshed in every frame in the normal driving mode. Thus, the normal driving mode includes only writing frames in which data is written in a pixel.

The display panel 100 may be refreshed in the low frequency mode according to the frequency of the low frequency driving mode. Thus, the low frequency driving mode includes writing frames in which data is written in a pixel and holding frames in which the written data is maintained without writing the data in the pixel.

The driving controller 200 receives the input image data IMG and an input control signal CONT from the host 600. The input image data IMG may include red image data, green image data and blue image data. The input image data IMG may include white image data. The input image data IMG may include magenta image data, yellow image data and cyan image data. The input control signal CONT may include a master clock signal and a data enable signal. The input control signal CONT may further include a vertical synchronization signal and a horizontal synchronization signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may further include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

For example, the driving controller 200 may adjust a driving frequency of the display panel 100 based on the input image data IMG. For example, the driving controller 200 may decrease the driving frequency of the display panel 100 in response to the input image data IMG. In the alternative, the driving controller 200 may increase the driving frequency of the display panel 100 in response to the input image data IMG The driving controller 200 generates the third control signal CONT3 for controlling an operation of the gamma reference voltage generator 400 based on the input control signal CONT, and outputs the third control signal CONT3 to the gamma reference voltage generator 400.

A structure and an operation of the driving controller 200 are explained referring to FIGS. 2 to 8 in detail.

The gate driver 300 generates gate signals for driving the gate lines GL in response to the first control signal CONT1 received from the driving controller 200. The gate driver 300 outputs the gate signals to the gate lines GL. For example, the gate driver 300 may sequentially output the gate signals to the gate lines GL. For example, the gate driver 300 may be mounted on the display panel 100. For example, the gate driver 300 may be integrated on the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an exemplary embodiment of the present inventive concept, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog form using the gamma reference voltages VGREF. The data driver 500 outputs the data voltages to the data lines DL.

Figure 2:
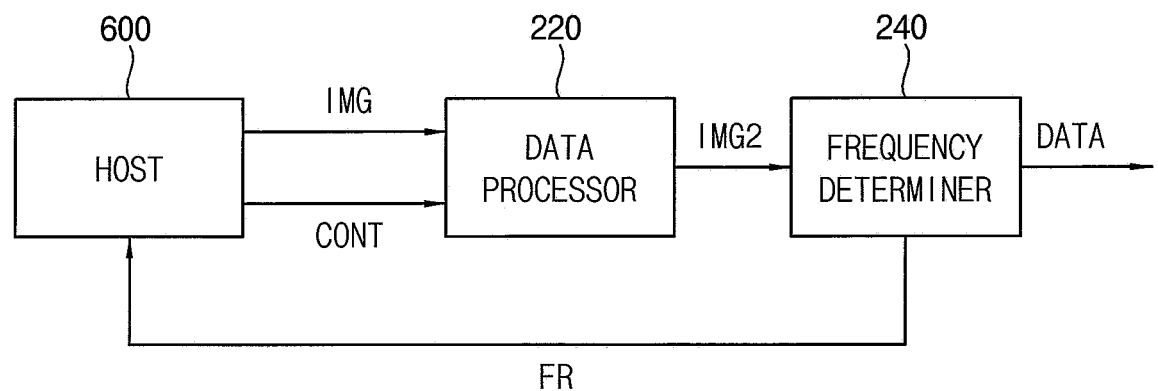
FIG. 2 is a block diagram illustrating a driving controller and a host of FIG. 1.
Figure 3:
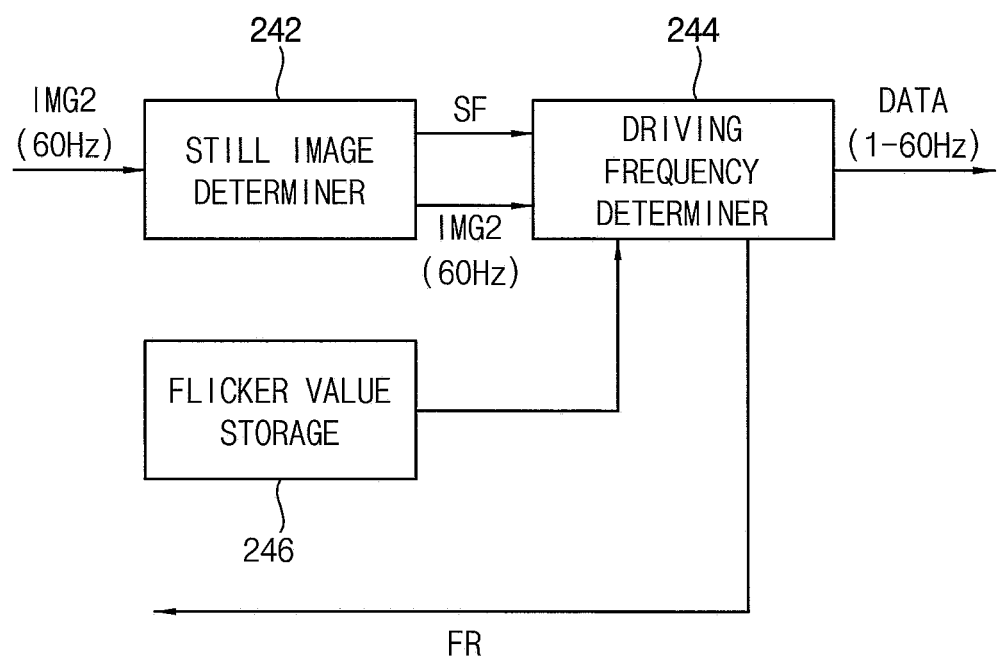
FIG. 3 is a block diagram illustrating a frequency determiner of FIG. 2.

FIG. 2 is a block diagram illustrating the driving controller 200 and the host 600 of FIG. 1. FIG. 3 is a block diagram illustrating a frequency determiner 240 of FIG. 2. FIG. 4 is a table illustrating a flicker value storage 246 of FIG. 3.

Referring to FIGS. 1 to 4, the driving controller 200 determines the driving frequency of the display panel 100 based on a flicker value according to a grayscale value of the input image data IMG. The display panel 100 may output a driving frequency signal FR regarding the driving frequency of the display panel 100 to the host 600.

The driving controller 200 may include a data processor 220 and a frequency determiner 240. The data processor 220 and the frequency determiner 240 may be implemented as electronic circuits.

The data processor 220 may receive the input image data IMG and the input control signal CONT from the host 600. The data processor 220 may generate intermediate image data IMG2 based on the input image data IMG In an exemplary embodiment of the present inventive concept, the data processor 220 may convert the input image data IMG having a first format into the intermediate image data IMG2 having a second format which corresponds to a data format of the driving controller 200.

For example, the data processor 220 may change a frequency of the input image data IMG to generate the intermediate image data IMG2. A frequency of the intermediate image data IMG2 may be equal to or greater than the frequency of the input image data IMG. The frequency of the intermediate image data IMG2 may be greater than the frequency of the input image data IMG. For example, the frequency of the input image data IMG may be 24 Hz, and the frequency of the intermediate image data IMG2 may be 60 Hz.

The data processor 220 may include a memory for storing the input image data IMG to generate the intermediate image data IMG2.

In an exemplary embodiment of the present inventive concept, the data processor 220 may transmit the input image data IMG to the frequency determiner 240 without converting the input image data IMG. In this case, the data processor 220 may function as a receiver of the driving controller 200.

The frequency determiner 240 may determine the driving frequency of the display panel 100 using a flicker value according to the grayscale value of the intermediate image data IMG2 (or according to the grayscale value of the input image data IMG). The frequency determiner 240 may output the driving frequency signal FR representing the driving frequency of the display panel 100 to the host 600.

For example, the driving frequency signal FR may be a synchronization signal corresponding to the driving frequency of the display panel 100. For example, the driving frequency signal FR may be a converted vertical synchronization signal generated by converting an input vertical synchronization signal corresponding to the frequency of the intermediate image data IMG2 to correspond to the driving frequency of the display panel 100.

For example, the driving frequency signal FR may represent a value of the driving frequency of the display panel 100.

For example, the driving frequency signal FR may be an image update request signal corresponding to the driving frequency of the display panel 100. The image update signal may inform the host 600 to provide new image data. The new image data may have a different frequency than previous image data.

The frequency determiner 240 may include a still image determiner 242, a driving frequency determiner 244 and a flicker value storage 246. The components of the frequency determiner 240, e.g., the still image determiner 242, the driving frequency determiner 244 and the flicker value storage 246 may be implemented as electronic circuits.

The still image determiner 242 may determine whether the intermediate image data IMG2 is a still image or a video image. The still image determiner 242 may output a flag SF representing whether the intermediate image data IMG2 is the still image or the video image to the driving frequency determiner 244. For example, when the intermediate image data IMG2 is the still image, the still image determiner 242 may output the flag SF of 1 to the driving frequency determiner 244. When the input image data IMG is the video image, the still image determiner 242 may output the flag SF of 0 to the driving frequency determiner 244. When the display panel 100 is operated in always on mode, the still image determiner 242 may output the flag SF of 1 to the driving frequency determiner 244.

When the flag SF is 1, the driving frequency determiner 244 may drive the switching elements in the pixel P with a low driving frequency. In other words, the switching elements in the pixel P may be driven with a low driving frequency when a still image is displayed on the display panel 100.

When the flag SF is 0, the driving frequency determiner 244 may drive the switching elements in the pixel P in a normal driving frequency. In other words, the switching elements in the pixel P may be driven with a normal driving frequency when a moving image is displayed on the display panel 100.

The driving frequency determiner 244 may use the flicker value storage 246 to determine the low driving frequency. The flicker value storage 246 may include a flicker value representing a degree of a flicker according to a grayscale value of the intermediate image data IMG2.

The flicker value storage 246 may store the grayscale value of the intermediate image data IMG2 and the flicker value corresponding to the grayscale value of the input image data IMG. The flicker value may be used for determining the driving frequency of the display panel 100. For example, the flicker value storage 246 may have a lookup table.

In FIG. 4, the input grayscale value of the intermediate image data IMG2 may be 8 bits, the minimum grayscale value of the intermediate image data IMG2 may be 0 and the maximum grayscale value of the intermediate image data IMG2 may be 255. The number of flicker setting stages of the flicker value storage 246 may be 64. When the number of the flicker setting stages increases, the flicker may be effectively removed but a logic size of the driving controller 200 may increase.

Although the input grayscale value of the intermediate image data IMG2 is 8 bits in FIG. 4, the present inventive concept may not be limited thereto.

In FIG. 4, the number of the grayscale values of the intermediate image data IMG2 is 256 and the number of the flicker setting stages is 64. Therefore, a single flicker value in the flicker value storage 246 may correspond to four grayscale values. For example, a first flicker setting stage stores the flicker value of 0 for the grayscale values of 0 to 3. Herein the flicker value of 0 may represent the driving frequency of 1 Hz. For example, a second flicker setting stage stores the flicker value of 0 for the grayscale values of 4 to 7. Herein the flicker value of 0 may represent the driving frequency of 1 Hz. For example, a third flicker setting stage stores the flicker value of 40 for the grayscale values of 8 to 11. Herein the flicker value of 40 may represent the driving frequency of 2 Hz. For example, a fourth flicker setting stage stores the flicker value of 80 for the grayscale values of 12 to 15. Herein the flicker value of 80 may represent the driving frequency of 5 Hz. For example, a fifth flicker setting stage stores the flicker value of 120 for the grayscale values of 16 to 19. Herein the flicker value of 120 may represent the driving frequency of 10 Hz. For example, a sixth flicker setting stage stores the flicker value of 160 for the grayscale values of 20 to 23. Herein the flicker value of 160 may represent the driving frequency of 30 Hz. For example, a seventh flicker setting stage stores the flicker value of 200 for the grayscale values of 24 to 27. Herein the flicker value of 200 may represent the driving frequency of 60 Hz. For example, a sixtieth flicker setting stage stores the flicker value of 0 for the grayscale values of 236 to 239. Herein the flicker value of 0 may represent the driving frequency of 1 Hz. For example, a sixty first flicker setting stage stores the flicker value of 0 for the grayscale values of 240 to 243. Herein the flicker value of 0 may represent the driving frequency of 1 Hz. For example, a sixty second flicker setting stage stores the flicker value of 0 for the grayscale values of 244 to 247. Herein the flicker value of 0 may represent the driving frequency of 1 Hz. For example, a sixty third flicker setting stage stores the flicker value of 0 for the grayscale values of 248 to 251. Herein the flicker value of 0 may represent the driving frequency of 1 Hz. For example, a sixty fourth flicker setting stage stores the flicker value of 0 for the grayscale values of 252 to 255. Herein the flicker value of 0 may represent the driving frequency of 1 Hz.

The driving frequency determiner 244 may output the driving frequency signal FR representing the driving frequency of the display panel 100 to the host 600.

Figures 5, 6:
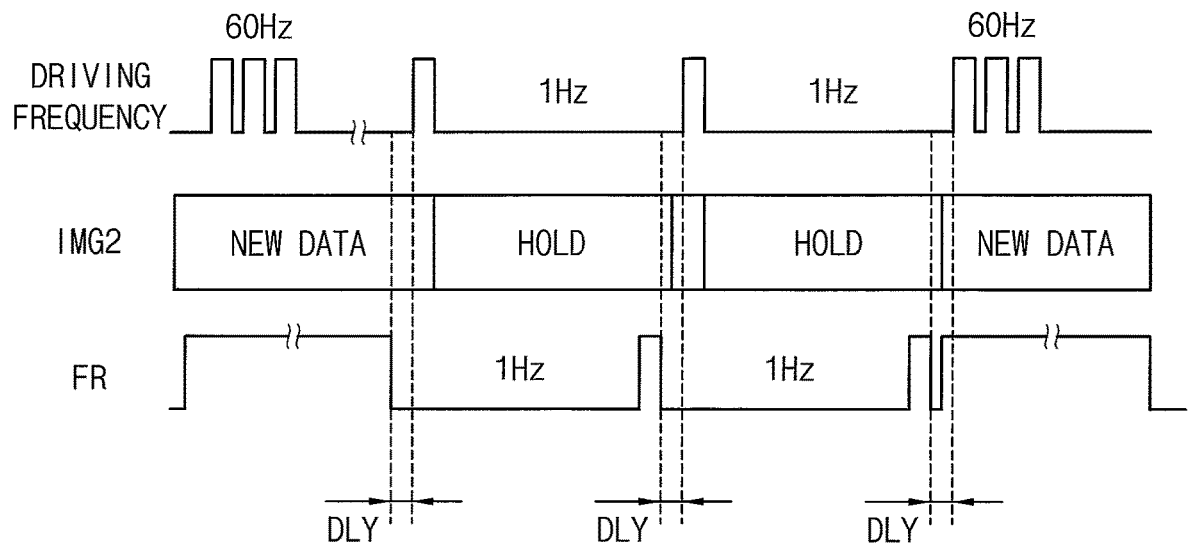
FIG. 5 is a timing diagram illustrating a driving frequency and a timing of a driving frequency signal determined by the frequency determiner of FIG. 2.
FIG. 6 is a table illustrating the timing of the driving frequency signal generated by the frequency determiner of FIG. 2.

FIG. 5 is a timing diagram illustrating the driving frequency and a timing of the driving frequency signal FR determined by the frequency determiner 240 of FIG. 2. FIG. 6 is a table illustrating the timing of the driving frequency signal FR generated by the frequency determiner 240 of FIG. 2.

Referring to FIGS. 1 to 6, the driving frequency signal FR may be output to the host 600 before the intermediate image data IMG2 are processed by the driving controller 200 and the data voltage is output to the display panel 100 by the data driver 500 considering a signal transmission delay.

In FIG. 5, the driving frequency in a first duration and a fourth duration may be 60 Hz and the driving frequency in a second duration and a third duration may be 1 Hz. In the duration of 60 Hz, the intermediate image data IMG2 may be refreshed at every frame. The refresh is indicated by NEW DATA in the 60 Hz duration. In the duration of 1 Hz, the intermediate image data IMG2 may be written once and may maintain a holding state for most frames (e.g., for fifty nine frames), thereby reducing power associated with multiple refreshes. The hold is indicated by HOLD in the 1 Hz duration. The information of the frequency (1 Hz) of the second duration may be transmitted to the host 600 during the first duration. In this case, the host 600 may provide a 1 Hz image signal to be displayed during the second duration. The information of the frequency (1 Hz) of the third duration may be transmitted to the host 600 during the second duration. The information of the frequency (60 Hz) of the fourth duration may be transmitted to the host 600 during the third duration. In this case, the host 600 may provide a 60 Hz image signal to be displayed during the fourth duration.

A timing information DLY for outputting the driving frequency signal FR to the host 600 by the driving controller 200 may be stored in the driving controller 200 as a parameter. For example, when the driving controller 200 outputs the driving frequency signal FR to the host 600 with no time delay (DLY, 0 us), the driving controller 200 may store 0x00. For example, when the driving controller 200 outputs the driving frequency signal FR to the host 600 with a time delay DLY of 10 us, the driving controller 200 may store 0x10. For example, when the driving controller 200 outputs the driving frequency signal FR to the host 600 with a time delay DLY of 20 us, the driving controller 200 may store 0x20. For example, when the driving controller 200 outputs the driving frequency signal FR to the host 600 with a time delay DLY of 100 us, the driving controller 200 may store 0xFF.

Figure 7:
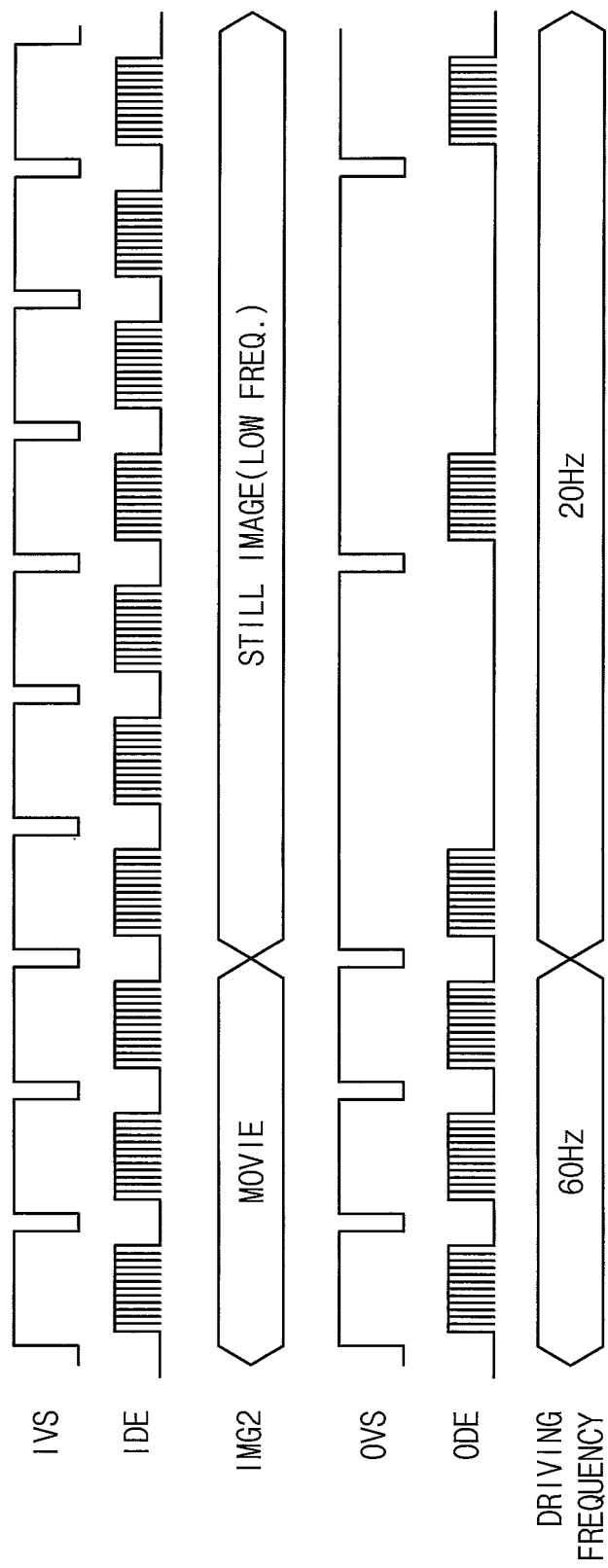
FIG. 7 is a timing diagram illustrating an input signal and an output signal of the driving controller of FIG. 1.

FIG. 7 is a timing diagram illustrating an input signal and an output signal of the driving controller 200 of FIG. 1.

Referring to FIGS. 1 to 7, the intermediate image data IMG2 may have a timing of an input vertical synchronization signal IVS and an input data enable signal IDE. The input vertical synchronization signal IVS and the input data enable signal IDE may have a uniform timing regardless of whether the intermediate image data IMG2 is the still image or the video image.

The driving frequency determiner 244 may determine the driving frequency of the display panel 100 and may generate a converted vertical synchronization signal OVS and a converted data enable signal ODE based on the determined driving frequency of the display panel 100.

In FIG. 7, a driving frequency of a video image display area MOVIE may be 60 Hz and a driving frequency of a still image display area STILL IMAGE may be 20 Hz.

The converted vertical synchronization signal OVS of the video image display area MOVIE may be same as the input vertical synchronization signal IVS of the video image display area MOVIE. The converted data enable signal ODE of the video image display area MOVIE may be same as the input data enable signal IDE of the video image display area MOVIE. The converted data enable signal ODE may be activated in every frame from first to sixty frames corresponding to the video image display area MOVIE.

The converted vertical synchronization signal OVS of the still image display area STILL IMAGE may be generated by masking a portion of the input vertical synchronization signal IVS of the still image display area STILL IMAGE. In addition, the converted data enable signal ODE of the still image display area STILL IMAGE may be generated by masking a portion of the input data enable signal IDE of the still image display area STILL IMAGE. For example, the converted data enable signal ODE of the still image display area STILL IMAGE may be activated once every three frames to represent the driving frequency of 20 Hz.

For example, the driving frequency signal FR output to the host 600 by the driving frequency determiner 244 may be the converted vertical synchronization signal OVS.

Figure 8:
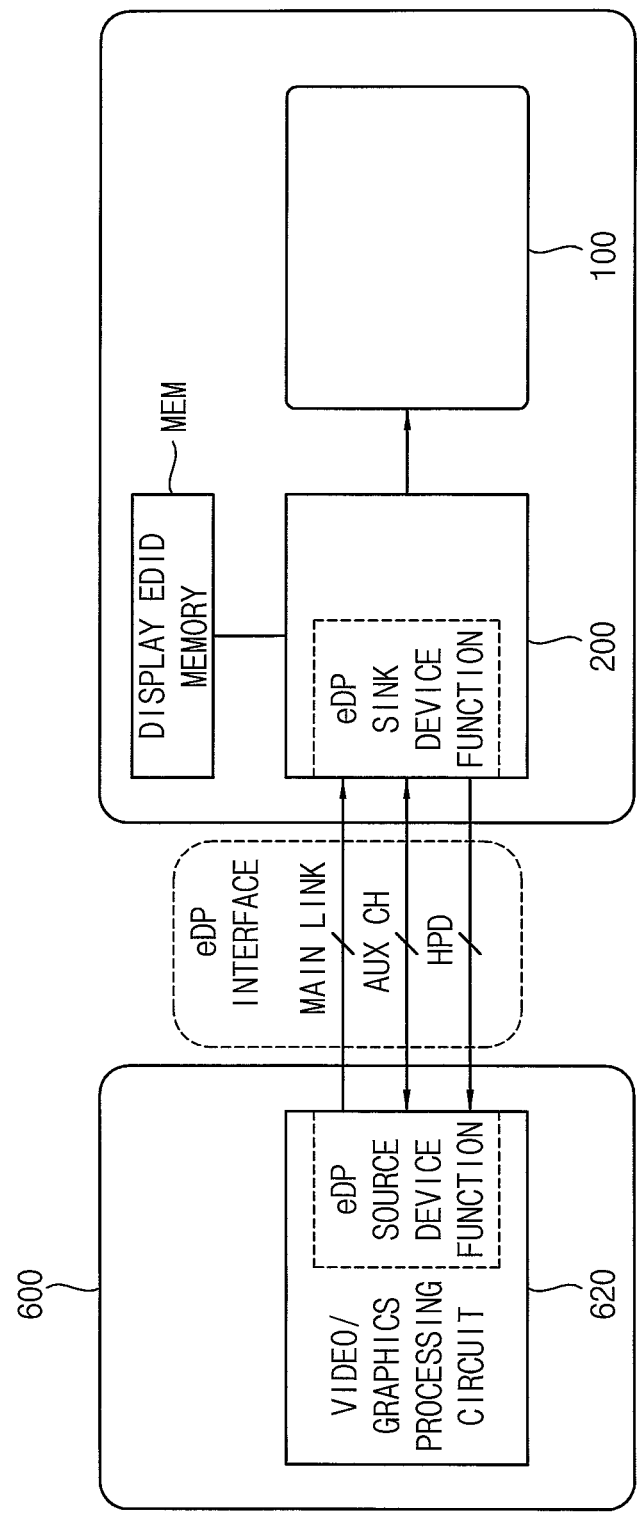
FIG. 8 is a diagram illustrating an interface between the host and the driving controller of FIG. 1.

FIG. 8 is a diagram illustrating an interface between the host 600 and the driving controller 200 of FIG. 1.

Referring to FIGS. 1 to 8, the driving controller 200 may communicate with the host 600 using an embedded display port (eDP) interface.

The host 600 includes a video graphics processing circuit 620. The video graphics processing circuit 620 may include a source device function circuit, e.g., an eDP source device function circuit.

The driving controller 200 may include a sink device function circuit, e.g., an eDP sink device function circuit. The source device function circuit and the sink device function circuit may be transceivers of the embedded display port interface.

The driving controller 200 may further include an extended display identification data (EDID) memory MEM for storing data received via the embedded display port interface.

The embedded display port interface may include a main link channel MAIN LINK for transmitting data in a direction only from the source device function circuit to the sink device function circuit, an auxiliary (AUX) channel AUX CH for transmitting data in both directions between the source device function circuit and the sink device function circuit and a hot plug detect channel HPD for transmitting data in a direction only from the sink device function circuit to the source device function circuit.

In an exemplary embodiment of the present inventive concept, the driving frequency signal FR may be included in a display port configuration data register and may be output to the host 600 through the AUX channel AUX CH. The display port configuration data register may be a register storing a communication agreement between the driving controller 200 and the host 600. The driving frequency signal FR in the display port configuration data register may be transmitted in both directions between the driving controller 200 and the host 600 and may be shared in both directions between the driving controller 200 and the host 600.

In an exemplary embodiment of the present inventive concept, the driving frequency signal FR may be output to the host 600 through the hot plug detect channel HPD.

Alternatively, the driving frequency signal FR may be output to the host 600 through an independent input and output port which is not described above.

According to the present exemplary embodiment, the driving frequency is determined according to the image displayed on the display panel 100 so that a power consumption of the display apparatus can be reduced. In addition, the driving frequency is determined using the flicker value of the image on the display panel 100 so that a flicker of the image can be prevented and a display quality of the display panel 100 can be enhanced. In addition, the information of the driving frequency of the display panel 100 is output to the host 600 so that the host 600 may output the input image data IMG to the driving controller 200 based on the information of the driving frequency of the display panel 100. Accordingly, the power consumption associated with the communication between the host 600 and the driving controller 200 may be further reduced.

Figure 9:
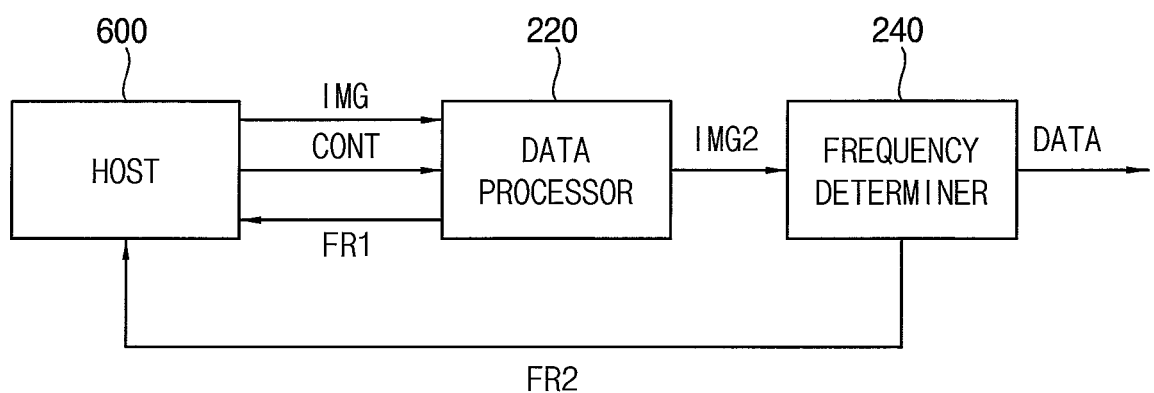
FIG. 9 is a block diagram illustrating a driving controller and a host of a display apparatus according to an exemplary embodiment of the present inventive concept.

FIG. 9 is a block diagram illustrating a driving controller and a host of a display apparatus according to an exemplary embodiment of the present inventive concept.

The display apparatus and the method of driving the display apparatus of FIG. 9 is substantially the same as the display apparatus and the method of driving the display apparatus of FIGS. 1 to 8 except for the structure and the operation of the driving controller. Thus, the same reference numerals may be used to refer to the same or like parts as those described for FIGS. 1 to 8 and any repetitive explanation concerning those elements may be omitted.

Referring to FIGS. 1 and 3 to 9, the display apparatus includes a display panel 100 and a display panel driver. The display panel driver includes a driving controller 200, a gate driver 300, a gamma reference voltage generator 400 and a data driver 500. The display apparatus may further include a host 600.

The driving controller 200 determines the driving frequency of the display panel 100 based on a flicker value according to a grayscale value of the input image data IMG. The display panel 100 may output a driving frequency signal regarding the driving frequency of the display panel 100 to the host 600.

The driving controller 200 may include a data processor 220 and a frequency determiner 240.

The data processor 220 may receive the input image data IMG and the input control signal CONT from the host 600. The data processor 220 may generate intermediate image data IMG2 based on the input image data IMG In the present exemplary embodiment, the data processor 220 may generate a synchronization signal FR1 corresponding to the input image data IMG and may output the synchronization signal FR1 to the host 600.

The frequency determiner 240 may determine the driving frequency of the display panel 100 using a flicker value according to the grayscale value of the intermediate image data IMG2 (or according to the grayscale value of the input image data IMG). The frequency determiner 240 may output the driving frequency signal FR2 representing the driving frequency of the display panel 100 to the host 600.

For example, the synchronization signal FR1 may be an input vertical synchronization signal IVS corresponding to the frequency of the intermediate image data IMG2. For example, the driving frequency signal FR2 may be a converted vertical synchronization signal OVS generated by converting the input vertical synchronization signal IVS corresponding to the frequency of the intermediate image data IMG2 to correspond to the driving frequency of the display panel 100.

The host 600 may receive the timing information (e.g., the normal driving frequency in the normal driving mode) of the intermediate image data IMG2 and the information of the low driving frequency in the low frequency driving mode so that the power consumption of the display apparatus may be effectively reduced.

According to the present exemplary embodiment, the driving frequency is determined according to the image displayed on the display panel 100 so that a power consumption of the display apparatus can be reduced. In addition, the driving frequency is determined using the flicker value of the image on the display panel 100 so that a flicker of the image can be prevented and a display quality of the display panel 100 can be enhanced. In addition, the information of the driving frequency of the display panel 100 is output to the host 600 so that the host 600 may output the input image data IMG to the driving controller 200 based on the information of the driving frequency of the display panel 100. Accordingly, the power consumption associated with the communication between the host 600 and the driving controller 200 can be further reduced.

Figure 10:
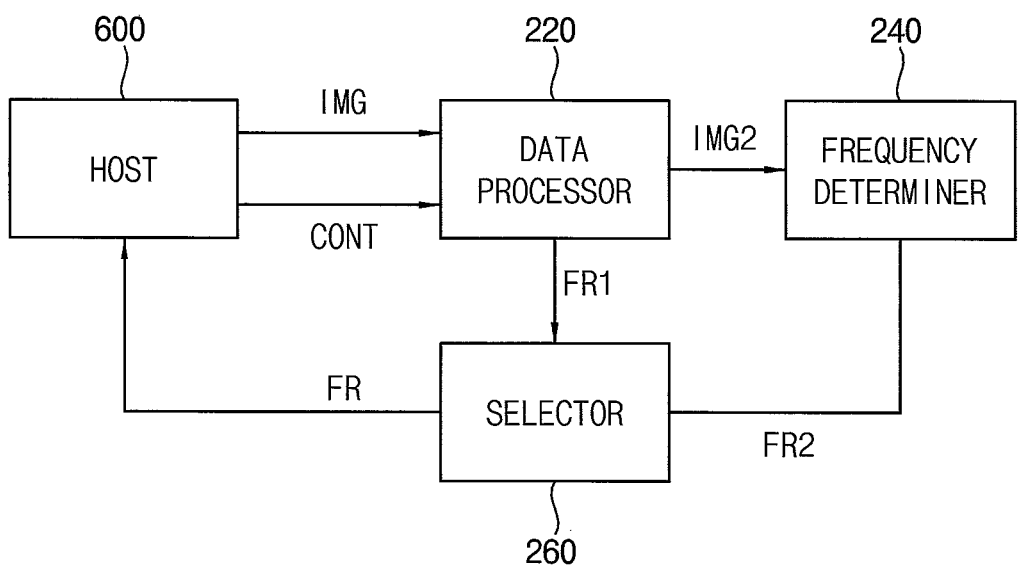
FIG. 10 is a block diagram illustrating a driving controller and a host of a display apparatus according to an exemplary embodiment of the present inventive concept.

FIG. 10 is a block diagram illustrating a driving controller and a host of a display apparatus according to an exemplary embodiment of the present inventive concept.

The display apparatus and the method of driving the display apparatus of FIG. 10 is substantially the same as the display apparatus and the method of driving the display apparatus of FIGS. 1 to 8 except for the structure and the operation of the driving controller. Thus, the same reference numerals may be used to refer to the same or like parts as those described for FIGS. 1 to 8 and any repetitive explanation concerning those elements may be omitted.

Referring to FIGS. 1, 3 to 8 and 10, the display apparatus includes a display panel 100 and a display panel driver. The display panel driver includes a driving controller 200, a gate driver 300, a gamma reference voltage generator 400 and a data driver 500. The display apparatus may further include a host 600.

The driving controller 200 determines the driving frequency of the display panel 100 based on a flicker value according to a grayscale value of the input image data IMG. The display panel 100 may output a driving frequency signal FR regarding the driving frequency of the display panel 100 to the host 600.

The driving controller 200 may include a data processor 220 and a frequency determiner 240. The driving controller 200 may further include a selector 260.

The data processor 220 may receive the input image data IMG and the input control signal CONT from the host 600. The data processor 220 may generate intermediate image data IMG2 based on the input image data IMG In the present exemplary embodiment, the data processor 220 may generate a synchronization signal FR1 corresponding to the input image data IMG and may output the synchronization signal FR1 to the selector 260.

The frequency determiner 240 may determine the driving frequency of the display panel 100 using a flicker value according to the grayscale value of the intermediate image data IMG2 (or according to the grayscale value of the input image data IMG). The frequency determiner 240 may output the driving frequency signal FR2 representing the driving frequency of the display panel 100 to the selector 260.

For example, the synchronization signal FR1 may be an input vertical synchronization signal IVS corresponding to the frequency of the intermediate image data IMG2. For example, the driving frequency signal FR2 may be a converted vertical synchronization signal OVS generated by converting the input vertical synchronization signal IVS corresponding to the frequency of the intermediate image data IMG2 to correspond to the driving frequency of the display panel 100.

When the intermediate image data IMG2 is a video image, the selector 260 may output the synchronization signal FR1 to the host 600 as the driving frequency signal FR. When the intermediate image data IMG2 is a still image, the selector 260 may output the driving frequency signal FR2 to the host 600 as the driving frequency signal FR.

According to the present exemplary embodiment, the driving frequency is determined according to the image displayed on the display panel 100 so that a power consumption of the display apparatus can be reduced. In addition, the driving frequency is determined using the flicker value of the image on the display panel 100 so that a flicker of the image can be prevented and a display quality of the display panel 100 can be enhanced. In addition, the information of the driving frequency of the display panel 100 is output to the host 600 so that the host 600 may output the input image data IMG to the driving controller 200 based on the information of the driving frequency of the display panel 100. Accordingly, the power consumption associated with the communication between the host 600 and the driving controller 200 can be further reduced.

Figure 11:
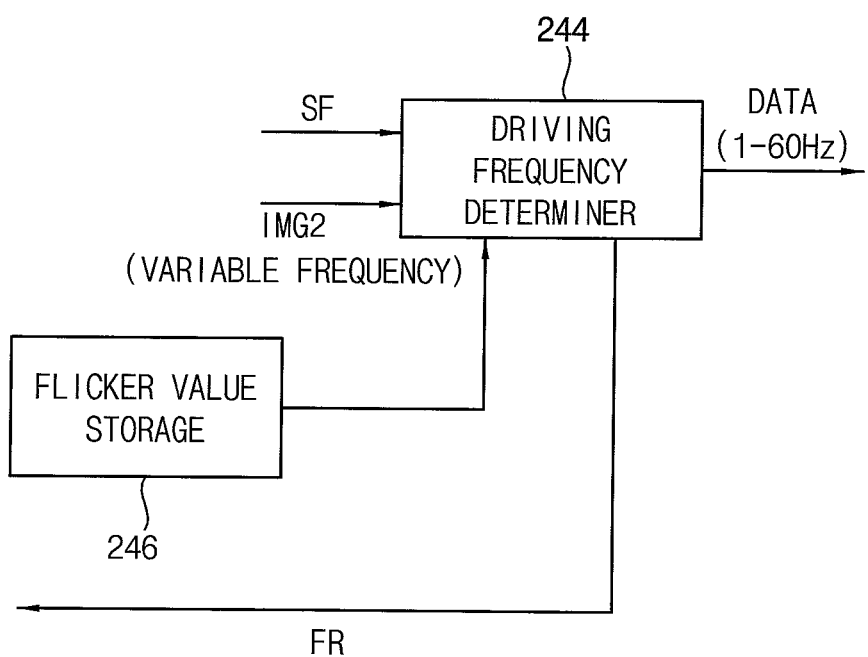
FIG. 11 is a block diagram illustrating a frequency determiner of a driving controller of a display apparatus according to an exemplary embodiment of the present inventive concept.

FIG. 11 is a block diagram illustrating a frequency determiner 240 of a driving controller 200 of a display apparatus according to an exemplary embodiment of the present inventive concept.

The display apparatus and the method of driving the display apparatus of FIG. 11 is substantially the same as the display apparatus and the method of FIGS. 1 to 8 except for the structure and the operation of the driving controller. Thus, the same reference numerals may be used to refer to the same or like parts as those described in FIGS. 1 to 8 and any repetitive explanation concerning those elements may be omitted.

Referring to FIGS. 1, 2, 4 to 8 and 11, the display apparatus includes a display panel 100 and a display panel driver. The display panel driver includes a driving controller 200, a gate driver 300, a gamma reference voltage generator 400 and a data driver 500. The display apparatus may further include a host 600.

The driving controller 200 determines the driving frequency of the display panel 100 based on a flicker value according to a grayscale value of the input image data IMG. The display panel 100 may output a driving frequency signal FR regarding the driving frequency of the display panel 100 to the host 600.

The driving controller 200 may include a data processor 220 and a frequency determiner 240.

The data processor 220 may receive the input image data IMG and the input control signal CONT from the host 600. The data processor 220 may generate intermediate image data IMG2 based on the input image data IMG The frequency determiner 240 may determine the driving frequency of the display panel 100 using a flicker value according to the grayscale value of the intermediate image data IMG2 (or according to the grayscale value of the input image data IMG). The frequency determiner 240 may output the driving frequency signal FR representing the driving frequency of the display panel 100 to the host 600.

The frequency determiner 240 may include a driving frequency determiner 244 and a flicker value storage 246.

In the present exemplary embodiment, the frequency determiner 240 may not include a still image determiner 242. In this case, the driving frequency determiner 244 may receive a flag SF representing whether the input image data IMG is the still image or the video image from the host 600.

In addition, in the present exemplary embodiment, the host 600 may determine whether the input image data IMG is the still image or the video image and may output the input image data IMG having a variable frequency to the driving controller 200. The data processor 220 may process the input image data IMG having the variable frequency to generate intermediate image data IMG having a variable frequency. The data processor 220 may output the intermediate image data IMG having the variable frequency to the frequency determiner 240.

According to the present exemplary embodiment, the driving frequency is determined according to the image displayed on the display panel 100 so that a power consumption of the display apparatus can be reduced. In addition, the driving frequency is determined using the flicker value of the image on the display panel 100 so that a flicker of the image can be prevented and a display quality of the display panel 100 can be enhanced. In addition, the information of the driving frequency of the display panel 100 is output to the host 600 so that the host 600 may output the input image data IMG to the driving controller 200 based on the information of the driving frequency of the display panel 100. Accordingly, the power consumption associated with the communication between the host 600 and the driving controller 200 can be further reduced.

Figure 13:
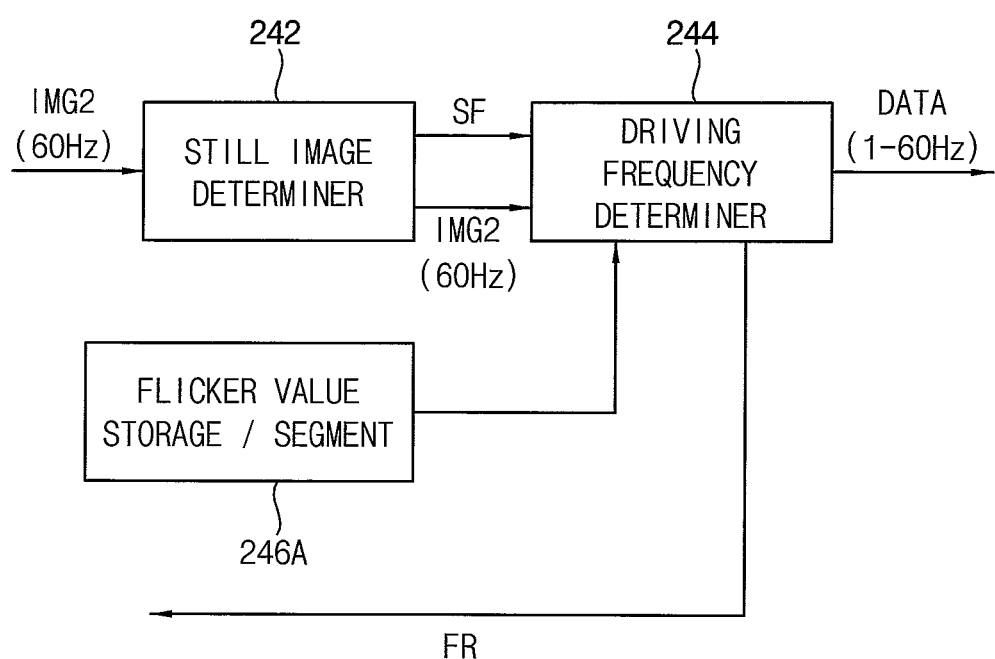
FIG. 13 is a frequency determiner of a driving controller of the display apparatus of FIG. 12.

FIG. 12 is a diagram illustrating a display panel 100 of a display apparatus according to an exemplary embodiment of the present inventive concept. FIG. 13 is a frequency determiner 240 of a driving controller 200 of the display apparatus of FIG. 12.

The display apparatus and the method of driving the display apparatus of FIGS. 12 and 13 is substantially the same as the display apparatus and the method of driving the display apparatus of FIGS. 1 to 8 except that the display panel is divided into a plurality of segments. Thus, the same reference numerals may be used to refer to the same or like parts as those described in FIGS. 1 to 8 and any repetitive explanation concerning those elements may be omitted.

Referring to FIGS. 1, 2, 4 to 8, 12 and 13, the display apparatus includes a display panel 100 and a display panel driver. The display panel driver includes a driving controller 200, a gate driver 300, a gamma reference voltage generator 400 and a data driver 500. The display apparatus may further include a host 600.

The driving controller 200 determines the driving frequency of the display panel 100 based on a flicker value according to a grayscale value of the input image data IMG. The display panel 100 may output a driving frequency signal FR regarding the driving frequency of the display panel 100 to the host 600.

The driving controller 200 may include a data processor 220 and a frequency determiner 240.

The data processor 220 may receive the input image data IMG and the input control signal CONT from the host 600. The data processor 220 may generate intermediate image data IMG2 based on the input image data IMG The frequency determiner 240 may determine the driving frequency of the display panel 100 using a flicker value according to the grayscale value of the intermediate image data IMG2 (or according to the grayscale value of the input image data IMG). The frequency determiner 240 may output the driving frequency signal FR representing the driving frequency of the display panel 100 to the host 600.

In the present exemplary embodiment, the display panel 100 may include a plurality of segments SEG11 to SEG85. Although the display panel 100 includes the segments in an eight by five matrix in the present exemplary embodiment, the present inventive concept is not limited thereto. For example, the display panel 100 may include segments in an eight by six matrix, an eight by four matrix, etc.

When the flicker value is determined for a unit of a pixel and only one pixel has a high flicker value, the entire display panel 100 may be driven in a high driving frequency to prevent the flicker in the one pixel. For example, when a flicker of only one pixel is prevented at the driving frequency of 30 Hz and the other pixels do not generate the flicker at the driving frequency of 1 Hz, the display panel 100 may be driven with the driving frequency of 30 Hz and the power consumption of the display apparatus may be higher than necessary.

Thus, when the display panel 100 is divided into the segments and the flicker value is determined for a unit of the segment, the power consumption of the display apparatus may be effectively reduced.

The frequency determiner 240 may determine optimal driving frequencies for the segments and may determine the maximum driving frequency among the optimal driving frequencies for the segments as the low driving frequency of the display panel 100.

For example, when an optimal driving frequency for a first segment SEG11 is 10 Hz and optimal driving frequencies for the other segments SEG12 to SEG85 except for the first segment SEG11 are 2 Hz, the frequency determiner 240 may determine the low driving frequency to be 10 Hz.

The frequency determiner 240 may include a still image determiner 242, a driving frequency determiner 244 and a flicker value storage 246A.

The driving frequency determiner 244 may access the flicker value storage 246A and obtain information of the segment(s) of the display panel 100 to determine the low driving frequency.

According to the present exemplary embodiment, the driving frequency is determined according to the image displayed on the display panel 100 so that a power consumption of the display apparatus can be reduced. In addition, the driving frequency is determined using the flicker value of the image on the display panel 100 so that a flicker of the image can be prevented and a display quality of the display panel 100 can be enhanced. In addition, the information of the driving frequency of the display panel 100 is output to the host 600 so that the host 600 may output the input image data IMG to the driving controller 200 based on the information of the driving frequency of the display panel 100. Accordingly, the power consumption associated with the communication between the host 600 and the driving controller 200 can be further reduced.

According to the exemplary embodiments of the present inventive concept as explained above, the power consumption of the display apparatus can be reduced and the display quality of the display panel can be enhanced.

While the present inventive concept has been particularly shown and described with reference to exemplary embodiments thereof, it will be apparent to those of ordinary skill in the art that various changes in form and detail may be made thereto.

What is claimed is:

1. A driving controller configured to determine a driving frequency and output a driving frequency signal representing the driving frequency to a host,
wherein the driving controller comprises:
a data processor configured to receive input image data from the host and generate intermediate image data based on the input image data; and
a frequency determiner configured to determine the driving frequency based on whether the intermediate image data represents a still image or a video image and output the driving frequency signal representing the driving frequency to the host,
wherein the driving frequency signal is output to the host before a data voltage corresponding to the intermediate image data is outputted to a display panel.

2. The driving controller of claim 1, wherein the frequency determiner comprises:
a flicker value storage configured to store flicker values for grayscale values of the intermediate image data; and
a driving frequency determiner configured to determine the driving frequency based on whether the intermediate image data represents the still image or the video image and information provided from the flicker value storage.

3. The driving controller of claim 2, wherein the frequency determiner further comprises a still image determiner configured to determine whether the intermediate image data represents the still image or the video image, generate a flag representing whether the intermediate image data represents the still image or the video image and output the flag to the driving frequency determiner.

4. The driving controller of claim 2, wherein the driving frequency determiner is configured to determine the driving frequency based on segment driving frequencies for segments of the display panel.

5. The driving controller of claim 1, wherein the data processor is configured to generate the intermediate image data by converting a frequency of the input image data, and
wherein a frequency of the intermediate image data is equal to or greater than the frequency of the input image data.

6. The driving controller of claim 1, wherein the driving frequency signal is a converted vertical synchronization signal generated by converting an input vertical synchronization signal corresponding to the frequency of the intermediate image data to correspond to the driving frequency.

7. The driving controller of claim 1, wherein the driving frequency signal is an image update request signal.

8. The driving controller of claim 1, wherein timing information for outputting the driving frequency signal to the host by the driving controller is stored in the driving controller as a parameter.

9. The driving controller of claim 1, wherein the data processor is configured to output a synchronization signal corresponding to the intermediate image data to the host, and
wherein the frequency determiner is configured to output the driving frequency signal to the host.

10. The driving controller of claim 9, wherein the synchronization signal is an input vertical synchronization signal corresponding to a frequency of the intermediate image data, and
wherein the driving frequency signal is a converted vertical synchronization signal generated by converting the input vertical synchronization signal to correspond to the driving frequency.

11. The driving controller of claim 1, wherein the driving controller further comprises a selector,
wherein the data processor is configured to output a synchronization signal corresponding to the intermediate image data to the selector,
wherein the frequency determiner is configured to output the driving frequency signal to the selector,
wherein when the intermediate image data represents the video image, the selector is configured to output the synchronization signal to the host, and
wherein when the intermediate image data represents the still image, the selector is configured to output the driving frequency signal to the host.

12. The driving controller of claim 1, wherein the driving controller is configured to communicate with the host using an embedded display port interface,
wherein the driving controller comprises a sink device function circuit, and
wherein the embedded display port interface comprises a main link channel configured to transmit data in a direction only from a source device function circuit of the host to the sink device function circuit, an auxiliary (AUX) channel configured to transmit data in both directions between the source device function circuit and the sink device function circuit and a hot plug detect channel configured to transmit data in a direction only from the sink device function circuit to the source device function circuit.

13. The driving controller of claim 12, wherein the driving frequency signal is included in a display port configuration data register and is output to the host through the AUX channel.

14. The driving controller of claim 12, wherein the driving frequency signal is output to the host through the hot plug detect channel.

* * * * *